(12) United States Patent
Niia et al.

(10) Patent No.: US 8,678,149 B2
(45) Date of Patent: Mar. 25, 2014

(54) GAS SPRING WITH TEMPERATURE COMPENSATION

(75) Inventors: Mikkel Rolf Olof Niia, Kiruna (SE);
Marten Johansson, Norrkoping (SE)

(73) Assignee: Stromsholmen AB, Tranas (SE)

( * ) Notice: Subject to any disclaimer, the term of this patent is extended or adjusted under 35 U.S.C. 154(b) by 118 days.

(21) Appl. No.: 13/521,359

(22) PCT Filed: Feb. 24, 2011

(86) PCT No.: PCT/SE2011/050209
§ 371 (c)(1),
(2), (4) Date: Jul. 10, 2012

(87) PCT Pub. No.: WO2011/105958
PCT Pub. Date: Sep. 1, 2011

(65) Prior Publication Data
US 2013/0038004 A1 Feb. 14, 2013

(30) Foreign Application Priority Data
Feb. 24, 2010 (SE) ........................................ 1050171

(51) Int. Cl.
*F16F 9/06* (2006.01)

(52) U.S. Cl.
CPC ..................................... *F16F 9/067* (2013.01)
USPC ....................................................... 188/276

(58) Field of Classification Search
CPC ........... F16F 9/064; F16F 9/065; F16F 9/067; B62K 25/08; B60G 11/27; B60G 15/12
USPC ............... 188/269, 276–278, 315; 267/64.11, 267/64.15, 64.22, 64.25, 120, 121
See application file for complete search history.

(56) References Cited

U.S. PATENT DOCUMENTS

| | | | | |
|---|---|---|---|---|
| 2,792,914 A | * | 5/1957 | Benard | 188/277 |
| 2,873,963 A | * | 2/1959 | Taylor | 267/64.25 |
| 3,469,661 A | * | 9/1969 | Lohr et al. | 188/269 |

(Continued)

FOREIGN PATENT DOCUMENTS

| | | |
|---|---|---|
| DE | 3044016 | 6/1982 |
| EP | 0362716 | 3/1976 |

OTHER PUBLICATIONS

Notification of Transmittal of the Intl. Search Report and Written Opinion dated May 30, 2011 for PCT/SE2011/050209.

*Primary Examiner* — Christopher Schwartz
(74) *Attorney, Agent, or Firm* — Fay Sharpe LLP

(57) ABSTRACT

A gas spring is described, which comprises a first part which defines a cylinder, which comprises a longitudinal axis and which is closed at a first end along the longitudinal axis. The gas spring further comprises a piston, which is arranged to be movable along the longitudinal axis in the cylinder, a piston rod which is connected to the piston and which projects out through a second end of the cylinder, a separating piston which is arranged to be movable in the cylinder along the longitudinal axis between the piston and the first end, gas which is contained in the cylinder between the separating piston and the first end, and liquid which is contained between the separating piston and the piston. Moreover, the gas spring comprises an expansion chamber for the liquid and a pressure regulating device, which is adapted to control the liquid transport between the cylinder and the expansion chamber in dependence of the temperature, thereby keeping the force characteristics of the gas spring substantially independent of the temperature.

19 Claims, 2 Drawing Sheets

(56) References Cited

U.S. PATENT DOCUMENTS

| | | | |
|---|---|---|---|
| 3,587,789 A * | 6/1971 | Keilholz et al. | 188/269 |
| 3,944,197 A | 3/1976 | Dachicourt | |
| 3,970,292 A | 7/1976 | Dachicourt et al. | |
| 4,513,953 A | 4/1985 | Molders et al. | |
| 4,529,180 A | 7/1985 | Hill | |
| 4,651,979 A * | 3/1987 | Freitag et al. | 267/64.13 |
| 4,886,248 A * | 12/1989 | Delhaye et al. | 267/64.26 |
| 5,538,276 A * | 7/1996 | Tullis | 280/124.158 |
| 5,775,677 A * | 7/1998 | Englund | 267/64.11 |
| 6,938,887 B2 * | 9/2005 | Achenbach | 267/64.22 |
| 8,522,540 B2 * | 9/2013 | Runesson et al. | 60/408 |

* cited by examiner

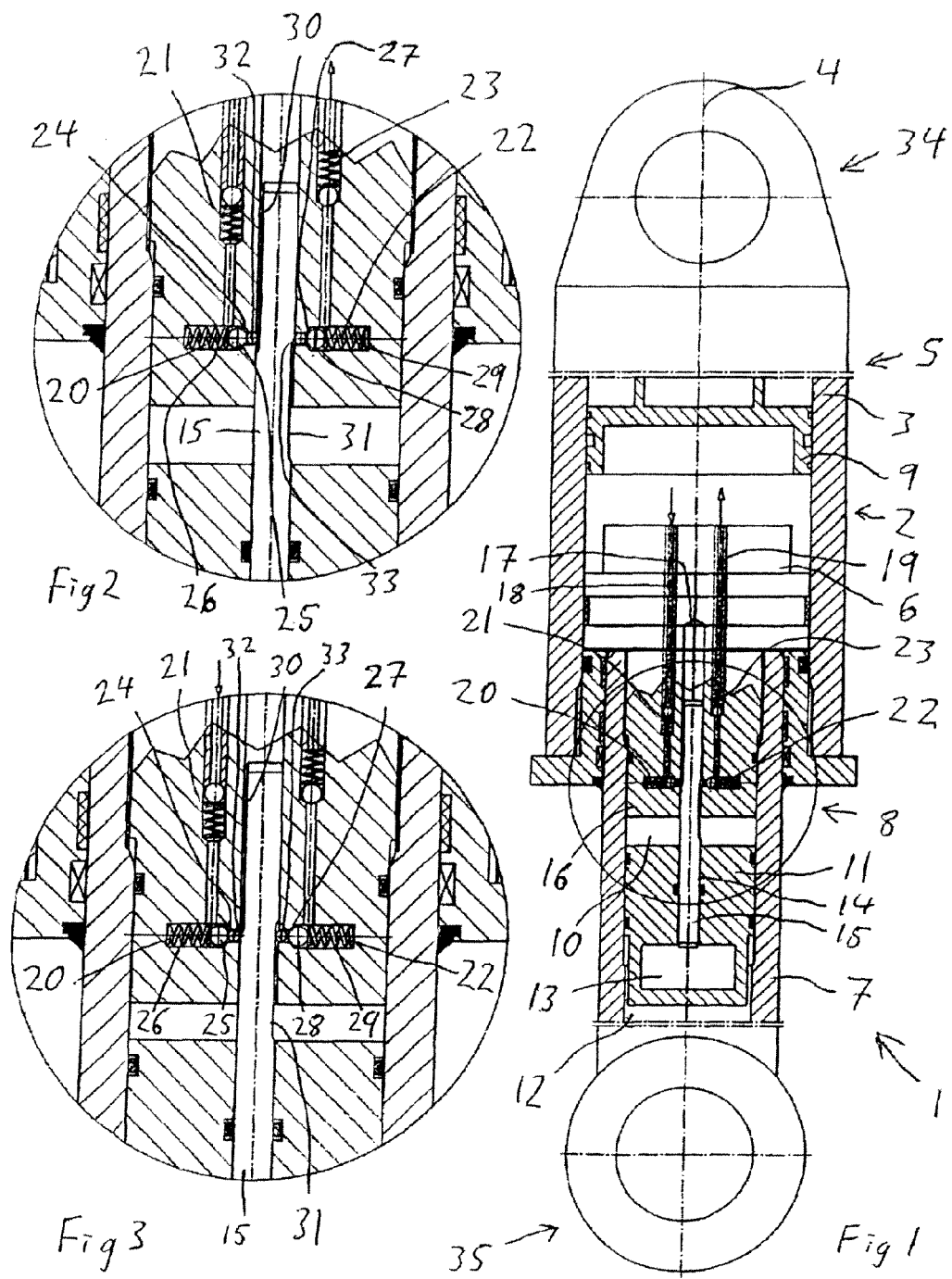

GAS SPRING WITH TEMPERATURE COMPENSATION

The present invention claims priority on PCT Application Serial No. PCT/SE2011/050209 filed Feb. 24, 2011, which in turn claims priority on Swedish Application Serial No. SE 1050171-6 filed Feb. 24, 2010.

TECHNICAL FIELD

The present document relates to a gas spring. More specifically, the document relates to a gas spring with oil damping intended for the suspension system of a vehicle.

BACKGROUND ART

Gas springs are used for suspension purposes in a large number of vehicles ranging from snowmobiles to large industrial trucks. Quite often the gas springs are provided with oil damping. The spring effect of a gas spring is based on the compression of gas, the pressure of the gas varying as a function of the compression. Gas springs usually comprise a cylinder which is closed at one end and in which gas is contained. A piston connected to a piston rod is movably arranged in the cylinder. The piston rod and the cylinder are mounted between two parts of the vehicle between which a spring action is desirable. When the spring is being used or when the ambient temperature rises, the temperature of the gas in the cylinder increases, which creates increased pressure on the gas and greater force is thus exerted on the piston. In the case where the gas spring also contains oil, which is the case in a gas spring with oil damping, also the expansion of the oil will contribute to the pressure increase. Correspondingly, a reduction of the temperature of the gas and the oil will result in reduced pressure in the gas and less force will thus be exerted on the piston.

The variation of the spring force in dependence of the gas temperature as described above may be acceptable as long as it is not too great. However, great variations in the spring force are undesirable as they will affect the behaviour of the vehicle on which the gas spring is mounted.

SUMMARY OF THE INVENTION

One object is to provide a gas spring which at least reduces the problems stated above.

A further object is to provide a gas spring which at least reduces the problem that the spring force varies as a function of the temperature.

The invention is defined by the appended independent claims. Embodiments of the invention will be apparent from the dependent claims, from the following description and from the appended drawings.

According to a first aspect a gas spring system is provided, comprising a first part which defines a cylinder, which comprises a longitudinal axis and which is closed at a first end along the longitudinal axis. The gas spring further comprises a piston which is arranged to be movable in the cylinder along the longitudinal axis, a piston rod which is connected to the piston and which projects out through a second end of the cylinder, a separating piston which is arranged to be movable in the cylinder along the longitudinal axis between the piston and the first end. Moreover, the gas spring comprises gas, which is contained in the cylinder between the separating piston and the first end, and liquid, which is contained between the separating piston and the piston. The gas spring is characterised in that it also comprises an expansion chamber for the liquid and a pressure regulating device, which is adapted to control the liquid transport between the cylinder and the expansion chamber in dependence of the temperature, thereby keeping the force characteristics of the gas spring substantially independent of the temperature.

By "gas spring system" is meant a gas spring with all the functional components integrated therein or a system comprising a gas spring and one or more external parts which cooperate with said gas spring.

In a gas spring system as described above liquid will be conducted away from the cylinder when the gas spring is hot. This will lower the pressure in the cylinder and will thus reduce the spring force exerted by the gas.

Liquid transport between the cylinder and the expansion chamber can occur in many different ways, but preferably occurs by way of the pressure difference between the cylinder and the expansion chamber, which pressure difference serves as the driving force.

In most embodiments the liquid is an oil, but the use of liquids other than oil is not excluded.

The pressure regulating device can comprise a measuring liquid chamber, which contains measuring liquid, and a pressure tube with a longitudinal axis in which a pressure spindle is movably arranged, the position of the pressure spindle in the pressure tube being dependent on the volume of the measuring liquid and the liquid transport between the cylinder and the expansion chamber being adapted to be controlled by the position of the pressure spindle. Advantageously, the position of the pressure spindle is used to control valves which allow a flow to or from the expansion chamber. Since the volume of the measuring liquid varies with the temperature, the position of the pressure spindle will change with the temperature.

Like the liquid, the measuring liquid is preferably a measuring oil, although the use of other measuring liquids is not excluded.

The measuring liquid chamber can be arranged in the piston rod. This is a space-saving arrangement of the measuring liquid chamber, which thus does not take up any space on the outside of the gas spring. Naturally, it is possible to position the measuring liquid chamber on the outside of the gas spring, in which case the transport of liquid between the measuring liquid chamber and the cylinder will occur through tubes. When the liquid has been transferred to the piston rod it no longer affects the spring force of the gas spring.

In the case where the measuring liquid chamber is arranged in the piston rod, the piston rod can comprise a piston rod cylinder, the measuring liquid chamber being arranged in a measuring liquid piston, which is movably arranged in the cylinder inside the piston rod. Advantageously, gas is contained behind the measuring liquid piston, such that the measuring liquid piston is subjected to a force acting in the direction of the piston.

In the case where the measuring liquid chamber is arranged in a measuring liquid piston, the expansion chamber can be arranged between the measuring liquid piston and the piston, the size of the expansion chamber being dependent on the position of the measuring liquid piston relative to the piston. In such an arrangement, the measuring liquid piston, and thus also the liquid in the expansion chamber, will be subjected to a pressure produced by the gas pressure behind the measuring liquid piston.

The pressure regulating device can comprise a valve mechanism which is fixedly arranged relative to the piston, said valve mechanism comprising a regulating space, which is coaxial with the pressure tube and in which the pressure spindle is movably arranged. Consequently, the pressure spindle is guided by both the pressure tube and the regulating space. The position of the pressure spindle in the valve mechanism controls the flow of liquid between the expansion chamber and the measuring liquid chamber.

The valve mechanism can comprise a first liquid line for conducting liquid from the cylinder to the expansion chamber, a first valve which is arranged in the first liquid line for controlling the liquid flow through the first liquid line, a second liquid line for conducting liquid to the cylinder from the expansion chamber, and a second valve which is arranged in the second liquid line for controlling the liquid flow through the second liquid line, the first valve and the second valve being controlled by the axial position of the pressure spindle relative to the valve mechanism. Having two separate liquid lines offers a simpler solution than having a single valve which needs to be switchable between two different flow directions.

Advantageously, not more than one of the valves is open for each axial position of the pressure spindle. In this way, the problem that the flow resistance varies for the same direction of flow can be avoided. If no pressure regulation is required both valves can be closed.

Advantageously, the valves are combined with the check valves, which ensure that the fluid can flow in only one direction in each liquid line.

Both the first valve and the second valve can comprise a ball, a valve seat and a spring which is adapted to force the ball against the valve seat, the valves being adapted to be opened by the balls being forced away from the valve seats, the pressure spindle comprising bevelled portions for each of the valves and the pressure spindle and the valves being arranged such that each of the valves is closed when the associated bevelled portion is positioned in front of the valve and is open when the bevelled portion is positioned at a distance from the valve and the pressure spindle thus forces the associated ball away from the valve seat.

In this embodiment the valve mechanism is realised in a simple manner. The valves may of course be realised also in other ways.

According to a second aspect, a gas spring system is provided comprising a measuring liquid chamber arranged externally of the gas spring.

The external measuring liquid chamber can communicate with a measuring liquid chamber arranged in the piston rod.

Furthermore, there is provided a gas spring system comprising an expansion chamber arranged externally of the gas spring.

Also provided is a gas spring system, comprising a pressure regulating unit, which is in fluid communication with the cylinder and which is arranged outside the piston rod.

According to a third aspect, a motor vehicle comprising a gas spring system according to the first aspect is provided.

A motor vehicle equipped with a gas spring system according to the first aspect will have road-holding properties which to a lesser extent are dependent on the atmospheric temperature than motor vehicles according to prior art.

According to a fourth aspect, there is provided a counterbalancing arrangement for counterbalancing two mutually movable parts, which is adapted to counteract the gravitational force of at least one of said movable parts, the counterbalancing arrangement comprising a gas spring system according to the above, which acts between said movable parts.

In this way, the system disclosed in WO 2010/098717 A1 can be further improved by the fact that variation in the characteristics of the gas springs included in the counterbalancing system, which springs are influenced by factors in the physical environment such as temperature fluctuations, can be reduced in the event of changes in the ambient temperature.

BRIEF DESCRIPTION OF THE DRAWINGS

Preferred embodiments will now be described with reference to the accompanying drawings.

FIG. 1 is a schematic view of a gas spring according to one embodiment.

FIG. 2 is an enlarged view of part of a pressure regulating device of the gas spring in a first position.

FIG. 3 is an enlarged view of part of a pressure regulating device of the gas spring in a second position.

DESCRIPTION OF EMBODIMENTS

Figure 5:
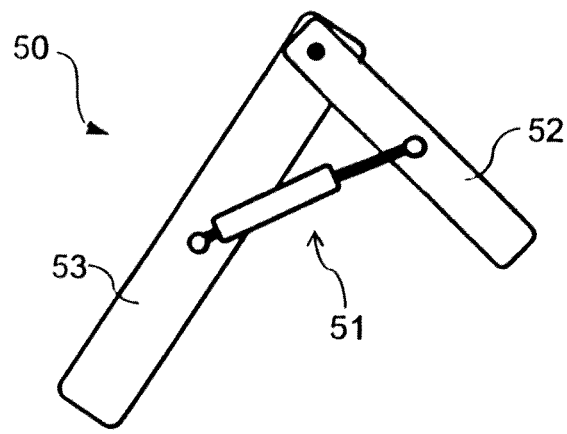
FIG. 5 is a schematic illustration of a robot arm comprising a gas spring.

In the following description the same reference numerals will be used to designate the same or similar distinctive features in the different figures. The figures are only schematic illustrations and the proportions between different dimensions can differ from those shown in the figures.

FIG. 1 is a schematic view of a gas spring 1 according to one embodiment. The gas spring 1 comprises a first part 2, which defines a cylinder 3 in which a gas is contained, and a longitudinal axis 4. The cylinder is closed at a first end 5. The gas spring 1 further comprises a piston 6, which is arranged to be movable in the cylinder 3 along the longitudinal axis 4, and a piston rod 7, which is connected to the piston 6 and projects out through a second end 8 of the cylinder.

The gas spring also comprises a separating piston 9, which is arranged to be movable in the cylinder 3 along the longitudinal axis 4 between the piston 6 and the first end 5. In the gas spring 1 gas is contained in the cylinder 3 between the separating piston 9 and the first end 5 and liquid is contained between the separating piston 9 and the piston 6.

The gas spring further comprises an expansion chamber 10 and a pressure regulating device, which is adapted to control the liquid transport between the cylinder and the expansion chamber 10 in dependence of the temperature, thereby keeping the force characteristics of the gas spring 1 substantially independent of the temperature.

The pressure regulating device in the embodiment shown in FIG. 1 comprises a measuring liquid piston 11, which is arranged to be movable in a piston rod cylinder 12 along the longitudinal axis 4, which piston rod cylinder 12 in turn is arranged in the piston rod 7. A measuring liquid chamber 13 is arranged in the measuring liquid piston 11, in which measuring liquid chamber measuring liquid is contained. Behind the measuring liquid piston 11, gas is contained which forces the measuring liquid piston 11 towards the piston 6. The measuring liquid piston 11 comprises a pressure tube 14, through which pressure tube 14 measuring liquid is adapted to flow during expansion of the measuring liquid. The pressure tube 14 is arranged in parallel with the longitudinal axis 4 and coincides in the embodiment shown with the longitudinal axis 4. A pressure spindle 15 is arranged in the pressure tube 14.

The pressure regulating device further comprises a valve mechanism 16 which is fixedly arranged relative to the piston 6. In the valve mechanism 16 there is provided a regulating space 17, which is coaxial with the pressure tube 14 and in which the pressure spindle 15 is movably arranged. The bottom of the regulating space 17 is in communication with the expansion chamber 10 such that the pressure spindle on one side is subjected to a pressure corresponding the pressure in the expansion chamber 10 and, on the other side, is subjected to a pressure corresponding to the pressure in the measuring liquid chamber 13.

The valve mechanism 16 comprises a first liquid line 18 for conducting liquid from the space between the piston 6 and the separating piston 9 to the expansion chamber 10 and a second liquid line 19 for conducting liquid to the space between the piston 6 and the separating piston 9 from the expansion chamber 10. The first liquid line 18 comprises a first valve 20 and a first check valve 21. Correspondingly, the second liquid line 19 comprises a second valve 22 and a second check valve 23. The valves 20, 22 and the check valves 21, 23 are shown in greater detail in FIG. 2 and FIG. 3. The gas spring comprises a first mounting element 34 in the first part 2 and a second mounting element 35 in the piston rod 7.

FIG. 2 is an enlarged view of part of the pressure regulating device of the gas spring 1 in a first position. The first valve 20 comprises a first valve seat 24 and a first ball 25, which is forced against the first valve seat 24 by means of a spring 26. The second valve 22 comprises in corresponding manner a second valve seat 27 and a second ball 28, which is forced against the second valve seat 27 by means of a spring 29. The pressure spindle 15 comprises a first bevelled portion 30, which is oriented towards the first valve 20, and a second bevelled portion 31, which is oriented towards the second valve 22. A first auxiliary ball 32 is arranged between the pressure spindle 15 and the first ball 25. Correspondingly, a second auxiliary ball 33 is arranged between the pressure spindle 15 and the second ball 28. In FIG. 2, the first bevelled portion 30 is positioned in front of the first valve 20 and the first ball 25 rests on the first valve seat 24, thereby keeping the first valve 20 closed. The second bevelled portion 31 is not positioned in front of the second valve 22. As a result, the pressure spindle 15 forces the second auxiliary ball 33 inwards so that it in turn forces the second ball 28 away, thereby keeping the second valve open.

FIG. 3 is an enlarged view of part of the pressure regulating device of the gas spring 1 in a second position. In the position shown in FIG. 3, the second bevelled portion 31 is positioned in front of the second valve 22, thereby keeping it closed. The pressure spindle 15 forces the first auxiliary ball 32, and in turn the first ball 25, inwards, thereby keeping the first valve 20 open.

The functioning of the gas spring will be described below with reference to FIGS. 1, 2 and 3. When the temperature of the gas spring rises, the volume of the measuring liquid will increase. As a result, the pressure spindle 15 will move towards the piston 6 such that the first bevelled portion 30 is no longer positioned in front of the first valve 20, as shown in FIG. 3. This will cause the second valve 20 to open. Due to the pressure, the liquid will now flow from the space between the piston 6 and the separating piston 9 as long as the pressure in said space is higher than the gas pressure behind the measuring liquid piston 11. The first check valve 21 will ensure that liquid flows only in the direction towards the expansion chamber 10.

When the temperature of the gas spring falls and the pressure in the cylinder 3 decreases, the pressure spindle 15 will move in the direction away from the piston 6, such that the second bevelled portion 31 is no longer positioned in front of the second valve. Due to the pressure, the liquid will now be allowed to flow out from the expansion chamber 10 as long as there is a higher pressure in the expansion chamber 10 than in the cylinder 3. The second check valve 23 will only allow liquid to flow in one direction from the expansion chamber 10.

The gas spring need not necessarily have a circular-cylindrical cylinder. It is of course conceivable to have cylinders of other shapes, such as an oval cylinder.

It is not necessary for the expansion chamber to be arranged in the piston rod. The expansion chamber can be arranged in a separate part outside the cylinder and the piston rod.

It is possible to use other types of valves than the ones described above.

In the embodiment described above, a liquid and a measuring liquid are mentioned. However, by liquid is preferably meant an oil and a measuring oil, respectively.

Figure 4:
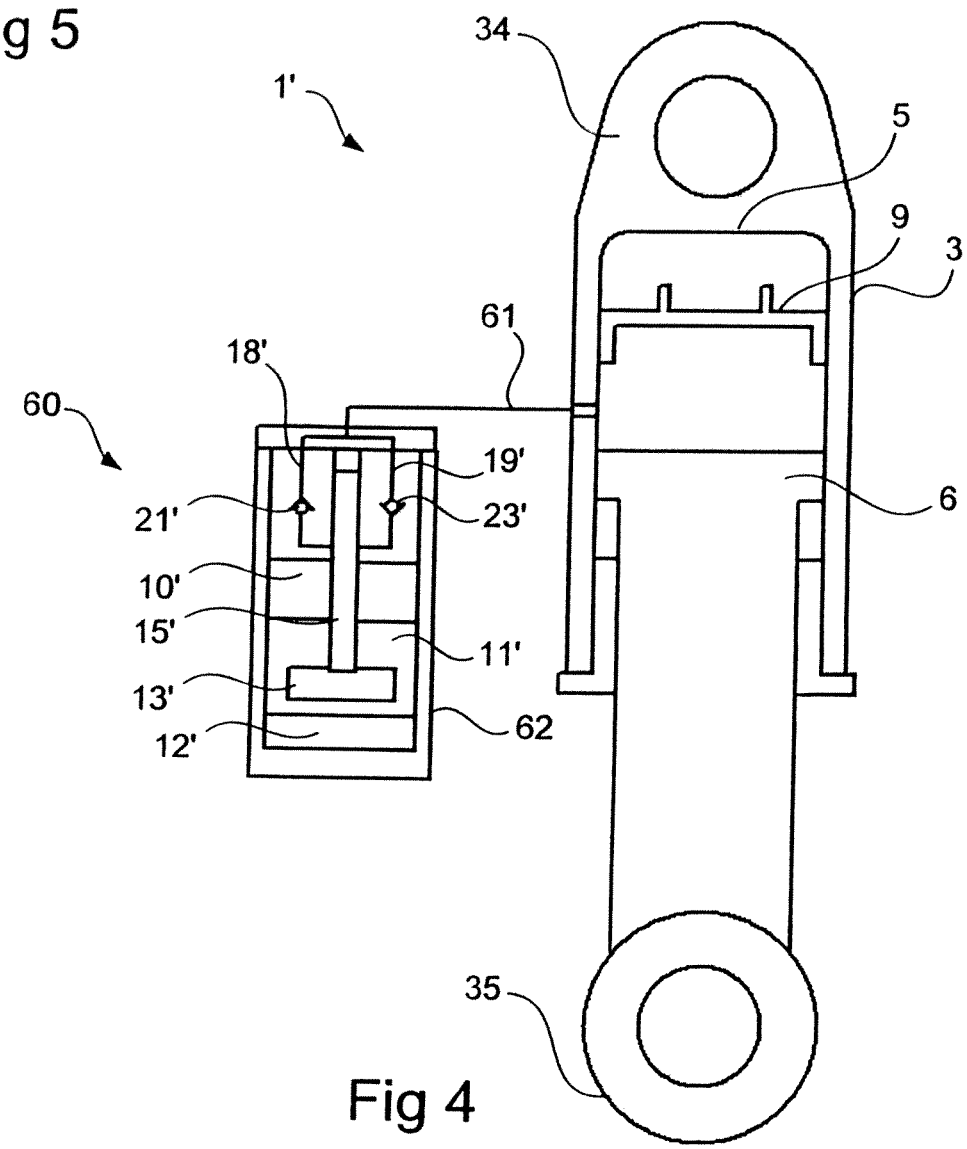
FIG. 4 is a schematic illustration of a gas spring according to an alternative embodiment.

With reference to FIG. 4, an embodiment of a gas spring 1' is shown, comprising an external pressure regulating device 60, which is arranged in a casing 62 and communicates via a conduit 61 (tube, pipe) with the liquid-filled chamber of the gas spring.

The external pressure regulating device 60 can be arranged externally of the piston/piston rod, as a part which is completely separated from the gas spring, or as a part which is fully or partially integrated with, for example, the cylinder casing.

In the embodiment shown in FIG. 4, not all the parts of the pressure regulating mechanism are shown, but can be understood with reference to FIGS. 1-3.

The separate casing 62 has a measuring liquid piston 11', which is displaceable inside the casing 62 and which accommodates the measuring liquid chamber 13'. In a space 12' gas is contained which forces the measuring liquid piston 11' towards the expansion chamber 10'. The pressure spindle 15' acts between the measuring liquid chamber 13' and the pressure regulating device 21'. The pressure regulating device is in communication with the liquid-filled chamber of the gas spring via the lines 61, 18', 19'.

In an alternative embodiment, only the measuring liquid chamber 13, 13' is arranged at least partly outside the gas spring.

For example, the external measuring liquid chamber and/or expansion chamber described above is/are arranged in such a manner that their sensitivity to variations in the ambient temperature is optimized.

As a result, the size of the internal measuring liquid chamber and/or expansion chamber can be reduced or said chamber or chambers can be eliminated altogether.

The gas spring and the gas spring system described above can be used in a counterbalancing arrangement 50 intended, for instance, for an industrial robot or a derrick boom, as shown in FIG. 5. In such an application, a gas spring 51 or a gas spring system can be arranged to act between two mutually movable parts 52, 53 in order to compensate, for instance, for the dead weight of one or both of the parts, as disclosed in WO 2010/098717 A1, the entire contents of which is herewith incorporated by reference.

The invention claimed is:
1. A gas spring system comprising:
 a first part which defines a cylinder, said cylinder includes a longitudinal axis and a first end which is closed along the longitudinal axis;
 a piston which is arranged to be movable in said cylinder along said longitudinal axis;
 a piston rod which is connected to said piston and projects out through a second end of said cylinder;

a separating piston which is arranged to be movable in said cylinder along said longitudinal axis between said piston and said first end;

a gas which is contained in said cylinder between said separating piston and said first end;

a liquid which is contained between said separating piston and said piston;

an expansion chamber for the liquid; and, a pressure regulating device designed to control liquid transport between said cylinder and said expansion chamber in dependence of a temperature to thereby keep force characteristics of said gas spring substantially independent of said temperature, said pressure regulating device including a measuring liquid chamber and a pressure tube, said measuring liquid chamber contains a measuring liquid, said pressure tube including a pressure spindle that is movably arranged in said pressure tube, a position of said pressure spindle in said pressure tube being dependent on a volume of said measuring liquid, said liquid transport between said cylinder and said expansion chamber being controlled by said position of said pressure spindle.

2. The gas spring system according to claim 1, wherein said measuring liquid chamber is arranged in said piston rod.

3. The gas spring system according to claim 2, wherein said piston rod includes a piston rod cylinder, said measuring liquid chamber being arranged in a measuring liquid piston which is movably arranged in said piston rod cylinder.

4. The gas spring system according to claim 3, wherein said expansion chamber is arranged between said measuring liquid piston and said piston, a size of said expansion chamber being dependent on said position of said measuring liquid piston relative to said piston.

5. The gas spring system according to claim 2, wherein said pressure regulating device includes a valve mechanism which is fixedly arranged relative to said piston, said valve mechanism including a regulating space which is coaxial with said pressure tube and in which said pressure spindle is movably arranged.

6. The gas spring system according to claim 5, wherein said valve mechanism includes a first liquid line for conducting liquid from said cylinder to said expansion chamber, a first valve which is arranged in said first liquid line for controlling said liquid flow through said first liquid line, a second liquid line for conducting liquid to said cylinder from said expansion chamber, and a second valve which is arranged in said second liquid line for controlling said liquid flow through said second liquid line, said first valve and said second valve being controlled by said axial position of said pressure spindle relative to said valve mechanism.

7. The gas spring system according to claim 6, wherein only one of said first and second valves is open for each axial position of said pressure spindle.

8. The gas spring system according to claim 6, wherein both said first valve and said second valve includes a ball, a valve seat and a spring which is designed to force said ball against said valve seat, said first and second valves being designed to be opened by said balls being forced away from said valve seats, said pressure spindle include bevelled portions for each of said first and second valves and said pressure spindle and said first and second valves being arranged such that each of said first and second valves is closed when an associated bevelled portion is positioned in front of said valve and is open when said bevelled portion is positioned at a distance from said first and second valves and said pressure spindle thus forcing said associated ball away from said valve seat.

9. The gas spring system according to claim 1, further comprising a measuring liquid chamber arranged externally of said gas spring.

10. The gas spring system according to claim 9, wherein said external measuring liquid chamber communicates with a measuring liquid chamber arranged in said piston rod.

11. The gas spring system according to claim 1, further comprising an expansion chamber arranged externally of said gas spring.

12. The gas spring system according to claim 1, comprising a pressure regulating unit which is in fluid communication with said cylinder and which is separate from said piston rod.

13. A gas spring system comprising:

a first part which defines a cylinder, said cylinder includes a longitudinal axis and a first end which is closed along the longitudinal axis;

a piston which is arranged to be movable in said cylinder along said longitudinal axis;

a piston rod which is connected to said piston and projects out through a second end of said cylinder;

a separating piston which is arranged to be movable in said cylinder along said longitudinal axis between said piston and said first end;

a gas which is contained in said cylinder between said separating piston and said first end; a liquid which is contained between said separating piston and said piston; an expansion chamber for the liquid; and, a pressure regulating device designed to control liquid transport between said cylinder and said expansion chamber in dependence of a temperature to thereby keep force characteristics of said gas spring substantially independent of said temperature, said pressure regulating device including a pressure tube including a pressure spindle that is movably arranged in said pressure tube and a valve mechanism which is fixedly arranged relative to said piston, said valve mechanism including a regulating space which is coaxial with said pressure tube and in which said pressure spindle is movably arranged.

14. The gas spring system as defined in claim 13, wherein said valve mechanism includes a first liquid line for conducting liquid from said cylinder to said expansion chamber, a first valve which is arranged in said first liquid line for controlling said liquid flow through said first liquid line, a second liquid line for conducting liquid to said cylinder from said expansion chamber, and a second valve which is arranged in said second liquid line for controlling said liquid flow through said second liquid line, said first valve and said second valve being controlled by said axial position of said pressure spindle relative to said valve mechanism.

15. The gas spring system as defined in claim 14, wherein only one of said first and second valves is open for each axial position of said pressure spindle.

16. The gas spring system as defined in claim 14, wherein both said first valve and said second valve includes a ball, a valve seat and a spring which is designed to force said ball against said valve seat, said first and second valves being designed to be opened by said balls being forced away from said valve seats, said pressure spindle include bevelled portions for each of said first and second valves and said pressure spindle and said first and second valves being arranged such that each of said first and second valves is closed when an associated bevelled portion is positioned in front of said valve and is open when said bevelled portion is positioned at a distance from said first and second valves and said pressure spindle thus forcing said associated ball away from said valve seat.

17. The gas spring system as defined in claim 13, said pressure regulating device including a measuring liquid chamber and a pressure tube, said measuring liquid chamber contains a measuring liquid, said pressure tube including a pressure spindle that is movably arranged in said pressure tube, a position of said pressure spindle in said pressure tube being dependent on a volume of said measuring liquid, said liquid transport between said cylinder and said expansion chamber being controlled by said position of said pressure spindle.

18. The gas spring system as defined in claim 13, wherein said measuring liquid chamber is arranged in said piston rod, said piston rod includes a piston rod cylinder, said measuring liquid chamber being arranged in a measuring liquid piston which is movably arranged in said piston rod cylinder, said expansion chamber is arranged between said measuring liquid piston and said piston, a size of said expansion chamber being dependent on said position of said measuring liquid piston relative to said piston.

19. The gas spring system as defined in claim 13, further comprising a measuring liquid chamber arranged externally of said gas spring, said external measuring liquid chamber communicating with a measuring liquid chamber arranged in said piston rod.

\* \* \* \* \*